United States Patent
McCormick et al.

(10) Patent No.: US 12,320,885 B2
(45) Date of Patent: Jun. 3, 2025

(54) PHYSICAL WAVEFORM OPTIMIZATION FOR MULTIPLE-BEAM MULTIFUNCTION DIGITAL ARRAYS

(71) Applicants: University of Kansas, Lawrence, KS (US); Government of the United States, as represented by the Secretary of the Air Force, Wright-Patterson Afb, OH (US)

(72) Inventors: Patrick M. McCormick, Beavercreek, OH (US); Cenk Sahin, Oakwood, OH (US); Shannon David Blunt, Shawnee, KS (US); Justin G. Metcalf, Norman, OK (US)

(73) Assignees: University of Kansas, Lawrence, KS (US); United States of America as Represented by the Secretary of the Air Force, Washington, DC (US)

( * ) Notice: Subject to any disclaimer, the term of this patent is extended or adjusted under 35 U.S.C. 154(b) by 314 days.

(21) Appl. No.: 17/086,006

(22) Filed: Oct. 30, 2020

(65) Prior Publication Data
US 2021/0132211 A1 May 6, 2021

Related U.S. Application Data (60) Provisional application No. 62/928,307, filed on Oct. 30, 2019.

(51) Int. Cl.
*G01S 13/538* (2006.01)
*G01S 7/00* (2006.01)
*G01S 13/02* (2006.01)

(52) U.S. Cl.
CPC ............ *G01S 13/538* (2013.01); *G01S 7/006* (2013.01); *G01S 2013/0254* (2013.01)

(58) Field of Classification Search
CPC . G01S 2013/0254; G01S 13/538; G01S 7/006
See application file for complete search history.

(56) References Cited

U.S. PATENT DOCUMENTS 8,195,122 B1 * 6/2012 Kahn ................ H04W 52/0241
455/404.2
2008/0150784 A1 * 6/2008 Zhang ..................... G01S 7/006
342/30

(Continued)

OTHER PUBLICATIONS

Guo et al ("Waveform Optimization for Transmit Beamforming with MIMO Radar Antenna Arrays," in IEEE Transactions on Antennas and Propagation, vol. 63, No. 2, pp. 543-552, Feb. 2015) (Year: 2015).*

(Continued)

*Primary Examiner* — Bernarr E Gregory
*Assistant Examiner* — Hailey R Le
(74) *Attorney, Agent, or Firm* — Norton Rose Fulbright US LLP (57) ABSTRACT

Systems and methods of embodiments provide a feasible approach to implementing Far-Field Radiated Emission Design (FFRED) techniques suitable for simultaneous transmission of radar and communication signals. A set of signals for transmission and a transmission direction for each signal of the set of signals may be determined. The set of signals includes at least a first signal associated with a first transmission direction and a second signal associated with a second transmission direction that is different from the first direction. An optimization problem is configured based on characteristics of an antenna array and the set of signals and then solved to identify a set of waveforms suitable for transmitting the signals. The set of waveforms may include at least two waveforms, each of the at least two waveforms configured for transmission by a different antenna element of the antenna array. The determined waveforms may be (Continued)

coherent in the far-field and suitable for power efficient transmission.

20 Claims, 5 Drawing Sheets

(56) References Cited

U.S. PATENT DOCUMENTS

| | | | |
|---|---|---|---|
| 2013/0176161 A1* | 7/2013 | Derham | G01S 13/04 |
| | | | 342/27 |
| 2018/0095161 A1* | 4/2018 | Kellum | G01S 13/10 |
| 2019/0227143 A1* | 7/2019 | Lindenfeld | G01S 13/582 |
| 2019/0260459 A1* | 8/2019 | Jeon | H04B 7/04 |
| 2020/0209347 A1* | 7/2020 | Schroder | G01S 7/0234 |
| 2020/0319327 A1* | 10/2020 | Tsvelykh | G01S 13/933 |
| 2021/0080580 A1* | 3/2021 | Tsvelykh | G01S 17/48 |

OTHER PUBLICATIONS

L. Guo, H. Deng, B. Himed, T. Ma and Z. Geng, "Waveform Optimization for Transmit Beamforming With MIMO Radar Antenna Arrays," in IEEE Transactions on Antennas and Propagation, vol. 63, No. 2, pp. 543-552, Feb. 2015, doi: 10.1109/TAP.2014.2382637 (Year: 2015).*

A. R. Chiriyath, S. Ragi, H. D. Mittelmann and D. W. Bliss, "Novel Radar Waveform Optimization for a Cooperative Radar-Communications System," in IEEE Transactions on Aerospace and Electronic Systems, vol. 55, No. 3, pp. 1160-1173, Jun. 2019, doi: 10.1109/TAES.2019.2908739 (Year: 2019).*

McCormick, P. M., et al., "Physical Waveform Optimization for Multiple-Beam Multifunction Digital Arrays," 2018 52nd Asilomar Conference on Signals, Systems, and Computers, Pacific Grove, CA, 2018, pp. 1036-1041, doi: 10.1109/ACSSC.2018.8645530.

* cited by examiner

PHYSICAL WAVEFORM OPTIMIZATION FOR MULTIPLE-BEAM MULTIFUNCTION DIGITAL ARRAYS

CROSS-REFERENCE TO RELATED APPLICATIONS

The present application claims the benefit of U.S. Provisional Application No. 62/928,307 filed Oct. 30, 2019 and entitled "PHYSICAL WAVEFORM OPTIMIZATION FOR MULTIPLE BEAM MULTIFUNCTION DIGITAL ARRAYS," the disclosure of which is incorporated by reference herein its entirety.

TECHNICAL FIELD

The present disclosure relates to generation of radio frequency (RF) waveforms and more specifically to generation of RF waveforms facilitating multiple different functionalities.

BACKGROUND

The radio spectrum is a fixed resource with an exponentially increasing demand from commercial communication applications. To meet the increased demand for commercial communication application, the radar spectrum has been eroded, which has created additional strain on defense applications that must already operate in congested and contested environments. As such, improving spectral efficiency (e.g., dynamic spectrum access) or developing methods to share spectrum between multiple functions (e.g., radar and communication sharing spectrum) has been the subject of ongoing research. Generally speaking, spectrum sharing can take two forms: cohabitation or co-design. The former tends primarily to address the interference that separately operated systems could cause to one another and the latter involves cooperative control within the same system. However, designing RF waveforms that are suited for sharing of the radio spectrum between both radar and communication functions has proved challenging.

One solution that has been proposed includes transmitting radar and communication waveforms from an antenna aperture that includes a plurality of antenna elements by transmitting the radar waveforms and the communication waveforms in different time segments. For example, the antenna aperture may transmit the radar waveforms for a first time period and transmit the communication waveforms for a second time period that is non-overlapping with respect to the first time period. While this solution does allow radar and communications to share the spectrum it is not an efficient inefficient solution since the two different modes of operation (e.g., radar and communications) cannot be used simultaneously.

It has been previously shown that a set of physically realizable frequency-modulated (FM) waveforms can be optimized using the Error Reduction Algorithm to emit simultaneous, pulsed radar and communications signals in different spatial directions using a technique referred to as Far-Field Radiated Emission Design (FFRED). The FFRED approach considers the transmission of multiple signals (e.g., radar and/or communications signals) simultaneously from a digital array while considering practical waveform attributes (e.g., constant amplitude, power efficiency). The FFRED approach has shown that optimized waveforms can be constrained to be constant amplitude by utilizing the spatial orthogonal complement to the desired transmission directions. While the FFRED approach described above has been demonstrated in theory, several challenges remain. For example, the transmitted waveforms may change from pulse to pulse, requiring a new set of waveforms to be determined for each pulse. Previous approaches for FFRED are unable to determine sets of waveforms suitable for simultaneous transmission of radar and communication signals when changes occur on a pulse-to-pulse basis. Thus, while the FFRED approach has been demonstrated in theory, real-world implementations remain impractical because the rapidly changing nature of the transmitted signals cannot be accounted for by existing FFRED implementations.

SUMMARY

Systems and methods are disclosed that provide a feasible implementation of FFRED algorithms suitable for real-world applications involving simultaneous transmission of radar and communication signals or other use cases. A set of signals for transmission and a transmission direction for each signal of the set of signals may be determined. The set of signals includes at least a first signal associated with a first transmission direction and a second signal associated with a second transmission direction that is different from the first direction. An optimization problem is configured based on characteristics of an antenna array and the set of signals and then solved to identify a set of waveforms suitable for transmitting the signals. To overcome the problems associated with previous FFRED approaches, a relaxed optimization problem is disclosed that enables the set of waveforms to be determined more rapidly, thereby accommodating the need to identify different waveforms when at least one of the transmitted signals (e.g., the radar signal or the communication signal) changes rapidly, such as from pulse-to-pulse. Solving the optimization problem may identify a set of waveform that exhibit high power efficiency, such as constant amplitude continuous waveforms, but may also seek to minimize wasted energy (e.g., transmitted waveform energy that is dispersed in directions other than those intended for a waveform). The set of waveforms may be coherent in the far-field, resulting in waveforms that are suitable for radar detection operations and may also facilitate long range communications.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
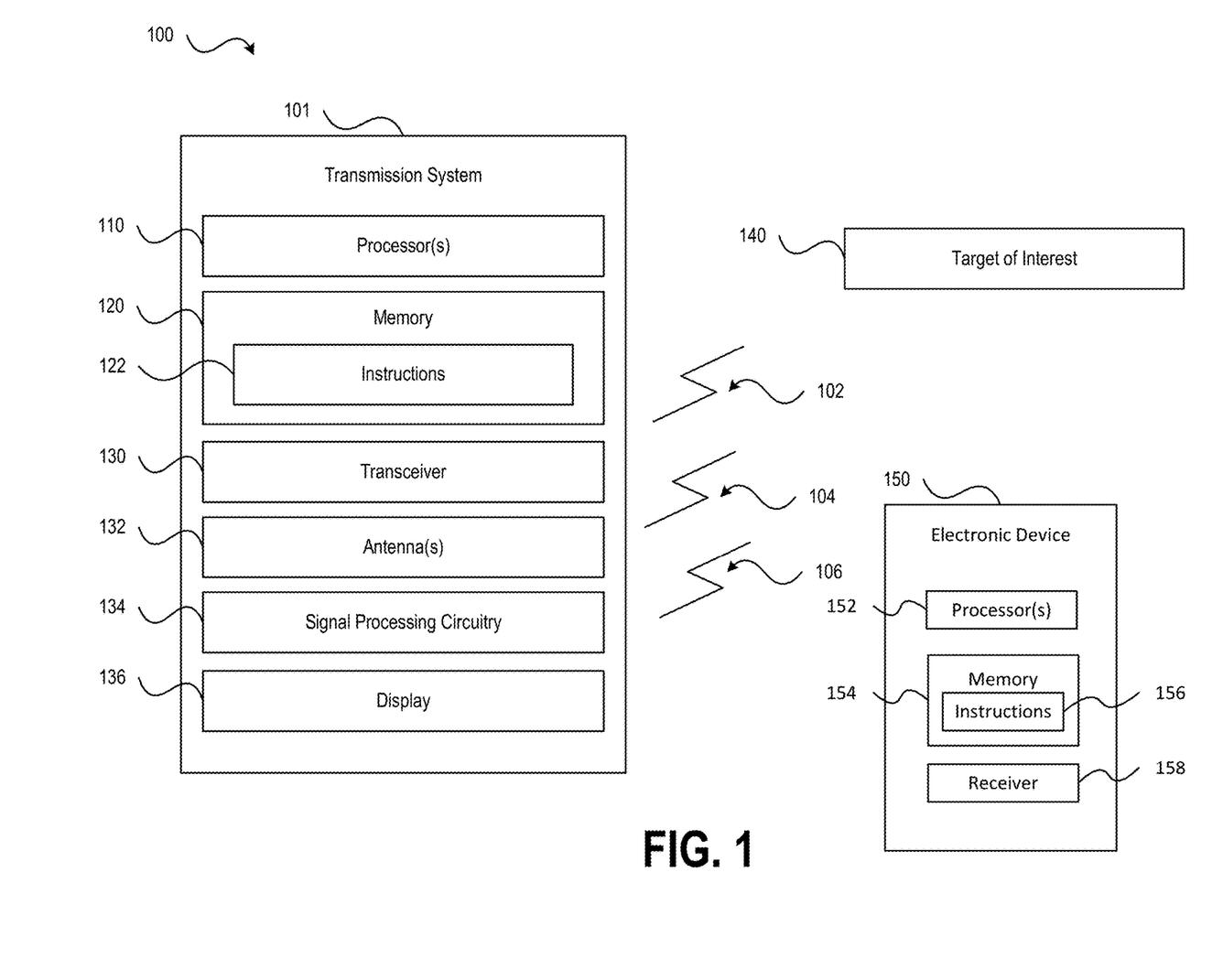
FIG. 1 is a block diagram illustrating aspects of a system for generating waveforms in accordance with the present disclosure in accordance with aspects of the present disclosure.

Referring to FIG. 1, a block diagram illustrating aspects of a system for generating waveforms in accordance with the present disclosure is shown as a system 100. The waveforms generated by the system 100 may facilitate improved spectral sharing between radar and communication functionalities, as described in more detail below. As shown in FIG. 1, the system 100 may include a transmission system 101 and an electronic device 150. During operation, the transmission system 101 may be configured to generate and output radar waveforms 102. The transmitted output radar waveforms 102 may sequentially backscatter from the environment and be detected as radar waveform returns 104 by the transmission system 101. The radar waveform returns 104 may be received and processed to perform radar detection operations. For example, the radar detection operations may include performing moving target detection of a target of interest 140 based on the received waveform returns 104. Additionally, the transmission system 101 may generate and transmit communication waveforms 106, which may configured to communicate data to the electronic device 150.

As illustrated in FIG. 1, the transmission system 101 may include one or more processors 110, a memory 120, a transmitter 130, signal processing circuitry 134, and a display device 136. The one or more processors 110 may include one or more central processing units (CPUs), digital signal processors (DSPs), application specific integrated circuits (ASICs), field programmable gate arrays (FPGAs), or other circuitry configured to process data in accordance with aspects of the present disclosure. The transceiver 130 may be configured to generate waveforms for transmission. The transceiver 130 may include a plurality of antenna elements 132 that may each be individually controlled to transmit a waveform and the waveforms transmitted by each antenna element 132 may be the same or different, as described in more detail below. The one or more antennas 132 may also be configured to receive the waveform returns 104 (or separate antenna elements 132 may be provided that are dedicated for reception of the waveform returns 104).

The signal processing circuitry 134 may include various signal processing components, such as amplifiers, analog-to-digital converters, phase locked loops, mixers, a detector, a diplexer, gain control circuitry, low noise amplifiers (LNAs), other types of signal processing circuitry, or a combination thereof. It is noted that the exemplary types of signal processing circuitry described above have been provided for purposes of illustration, rather than by way of limitation and that the specific components of a radar detection system configured in accordance with the present disclosure may include less signal processing components, more signal processing components, or different signal processing components depending on the particular configuration or design of the radar detection system. The display device 136 may be configured to display radar data associated with detection of ground moving targets, such as information associated with the target of interest 140.

As shown in FIG. 1, the memory 120 may store instructions 122 that, when executed by the one or more processors 110, cause the one or more processors 110 to perform operations to generate, transmit, and process waveforms in accordance with the concepts disclosed herein and described in more detail below. Additionally, although capable of implementation via software, it should be understood that the techniques disclosed herein may be readily implemented in hardware if desired. Accordingly, the present disclosure is not to be limited to software implementations.

During operation, the transceiver 130 may generate first waveforms for transmission as output waveforms 102 and second output waveforms 106. The output waveforms 102 may be radar waveforms that are transmitted by the transmission system 101 to perform moving target detection, where objects within the path of the output waveforms 102, such as the target of interest 140, may reflect the output waveforms 102 to produce radar returns 104. Some of the radar returns 104 may be received at the antenna elements 132 and provided as input to the signal processing circuitry 134 to facilitate processing of the radar returns 104 in accordance with aspects of the present disclosure, such as to facilitate radar detection operations and processing. To illustrate, the processing of the radar returns 104 may be utilized to perform moving target detection, such as to detect the target of interest 140, and the results of the moving target detection may be displayed at the display device 136. It is noted that although the system 100 is described as being configured to present results of moving target detection at display device 136, this has been described for purposes of illustration, rather than by way of limitation. For example, embodiments of the present disclosure may record location information or other data derived from the ground moving target detection in a database, which may be stored at the memory 120 (or another memory device accessible to the transmission system 101) instead of, or in addition to, displaying the results at the display device 136.

Additionally, the transmission system 101 may generate communication waveforms 106 that may be transmitted to, and received by the electronic device 150, such as to enable the electronic device 150 to perform communication signal processing with respect to the communication waveform 106 to receive data. As shown in FIG. 1, the electronic device 150 may include one or more processors 152, a memory 154, and a receiver 158. The one or more processors 152 may include one or more CPUs, DSPs, ASICs, FPGAs, or other circuitry configured to process data in accordance with aspects of the present disclosure. The memory 154 may store instructions 156 that, when executed by the one or more processors 152, cause the one or more processors 152 to perform operations for receiving and processing communication waveforms in accordance with aspects of the present disclosure.

Figure 2:
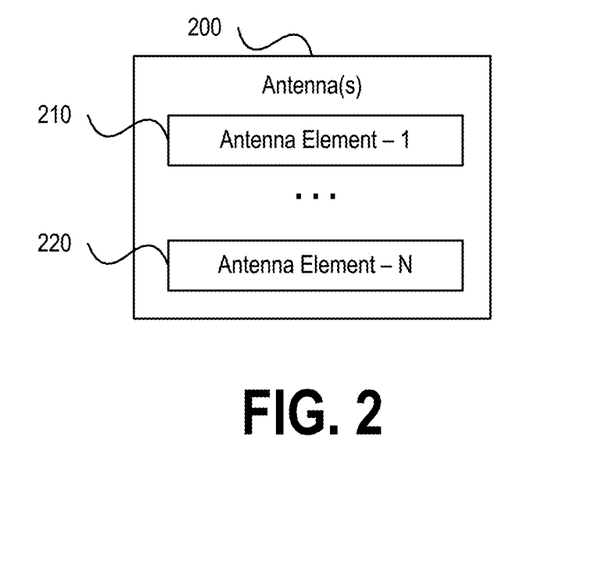
FIG. 2 is a block diagram illustrating aspects of an antenna array of a system operating in accordance with aspects of the present disclosure.
Figure 3:
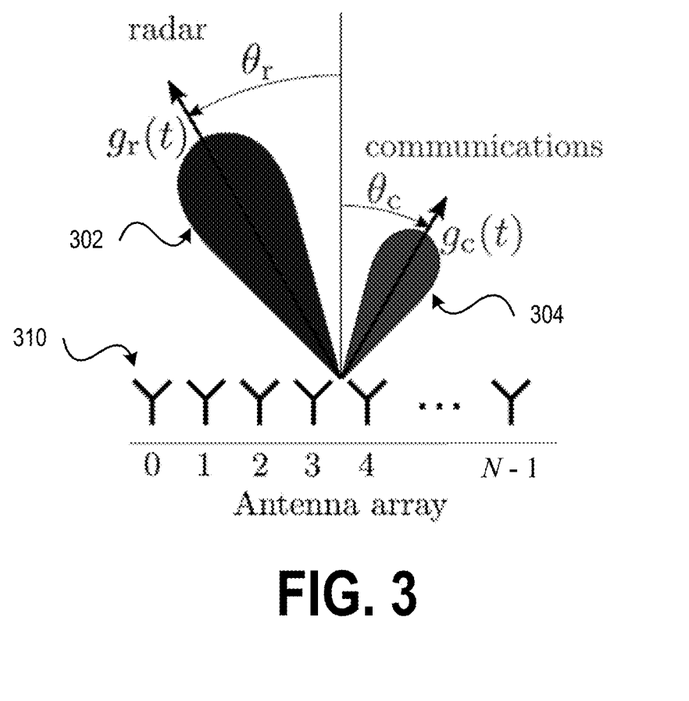
FIG. 3 is a diagram illustrating aspects of transmitting waveforms using a system operating in accordance with aspects of the present disclosure.

Turning briefly to FIGS. 2 and 3, exemplary aspects of the antenna elements and configuration of the antenna elements for transmission of the waveforms 102, 106 of embodiments are shown. In FIG. 2, the antennas 132 are shown as including an array of N antenna elements, where N>2. The plurality of antenna elements is shown as including antenna elements 210, 220. It is noted that FIG. 2 shows the antennas 132 ad including 2 antenna elements for purposes of illustration, rather than by way of limitation and that the antennas 132 may include more than 2 antenna elements according to some aspects of the present disclosure. As shown in FIG. 3, the antenna elements 310 (e.g., the antenna elements 132 of FIG. 1) may be individually configured to transmit a radar waveform 302 (e.g., the radar waveforms 102 of FIG. 1) and a communication waveforms 304 (e.g., the communication waveforms 106 of FIG. 1).

The radar waveforms 302 and the communication waveforms 304 may be transmitted by the antenna elements 310 in different spatial directions. It is noted that the radar waveforms 302 and communication waveforms 304 may be individually configured for he each of the antenna elements 310. For example, the radar waveforms 302 and the communication waveforms 304 may be transmitted by multiple antenna elements of the antenna elements 310 and each antenna element may transmit a different waveform to account for the spatial arrangement of the antenna elements and the directionality with which the waveforms are to be transmitted. As will be described in more detail below, aspects of the present disclosure may utilize an optimization function to determine an optimized set of waveforms that may be used for transmission of the radar waveforms 302 and the communication waveforms 304 such that the waveforms are highly correlated despite potentially having different modulation structures, different angles of transmission, different beam powers, and the like. This allows the waveforms to have desired properties in the far field while maintaining high power efficiency (e.g., energy on target and return energy while minimizing wasted energy or power).

Returning to FIG. 1, the transmission system 101 may be configured to determine a set of waveforms for transmission of both a radar signal (e.g., the radar waveforms 102) and a communication signal (e.g., the communication waveforms 104). To generate the waveforms 102, 106, the transmission system 101 may utilize a relaxed objective function designed to reduce the computational cost of finding a set of waveforms that meet both the constant amplitude and desired emission constraints. The simplified objective function may not explicitly reduce the energy within the orthogonal complement, however, for a particular waveform initialization the resulting waveforms after optimization can be shown to be near-optimal through comparison to an optimality bound calculated via the Lagrange dual problem. More importantly, the relaxed objective function may enable systems to implement or at least come close to an actual realization of a FFRED-based solution to simultaneous transmission of radar and communication signals.

To illustrate the relaxed approach of embodiments, consider an M element antenna array (e.g., the antennas 132) with an arbitrary geometry satisfying the narrowband assumption (for some transmission bandwidth B) indexed as m=0, . . . , M−1. It may be assumed that this array has full control over the waveforms transmitted by each element (i.e., a digital array). Now define $F_m(\theta, \varphi)$ as the time-harmonic (with respect to some center frequency $f_c$) in-situ far-field antenna pattern for the mth element as a function elevation $\theta$ and azimuth $\varphi$, where it is assumed that the polarization of all antennas are aligned.

Given a set of complex-baseband continuous waveforms $\{s_0(t), s_1(t), \ldots, s_{M-1}(t)\}$ transmitted by the corresponding antenna elements as a function of time t, a complex-baseband far-field emission can be written as:

$$g(t,\theta,\varphi) = \sum_{m=0}^{M-1} F_m(\theta,\varphi) s_m(t), \qquad (1)$$

Within this emission structure, define L desired signals $g_\ell(t)$ of pulse duration T to be realized in directions $(\theta_\ell, \varphi_\ell)$ for $\ell = 0, \ldots, L-1$. Each of these constraints on the emission $g(t, \theta, \varphi)$ can be expressed as:

$$g(t,\theta_\ell,\varphi_\ell) = g_\ell(t), \qquad (2)$$

To facilitate the design of the M waveforms $s_m(t)$, the constraints may be discretized according to a sampling rate $f_s$. In an aspect, the L desired signals $g_\ell(t)$ may be oversampled with respect to the signal bandwidth B to maintain sufficient fidelity of the desired signal. In an aspect, the sampling frequency may be expressed as $f_s = \kappa B$, where $\kappa \geq 2$, which has been found to be sufficient.

For a sampling period $T_s = 1/f_s$, define $s_m[n] = s_m(nT_s)$ and $g_\ell[n] = g_\ell(nT_s)$ as the nth sample of the mth waveform and $\ell$ th desired signal, respectively. For pulse duration T, the length of each sequence is $N = f_s T$. These sequences may be collected into the complex-valued matrices $S \in \mathbb{C}^{M \times N}$ and $G \in \mathbb{C}^{L \times N}$ for $[S]_{m,n} = s_m[n]$ and $[G]_{\ell,n} = g_\ell[n]$, where $[\bullet]_{i,j}$ represents the (i,j)th element of the matrix. The M complex scalars of the antenna patterns for the L desired transmission directions $(\theta_\ell, \varphi_\ell)$ may also be collected into the matrix $C \in \mathbb{C}^{M \times N}$ for $[C]_{m,\ell} = F_m^*(\theta_\ell, \varphi_\ell)$ and $(\bullet)^*$ represents complex-conjugation. Therefore, the discretized emission constraints can be written in matrix form as:

$$C^H S = G, \qquad (3)$$

where $(\bullet)^H$ is the Hermitian transpose.

Given C and G, a waveform matrix S may be designed such that the above-described constraints are met. As long as C has full column rank and L<M, there are an infinite many solutions. However, this does not mean that every possible solution is an optimized solution. To identify a particular solution, the above-described waveform design may be formulated as an optimization problem using two different methods: a minimum-norm method, and the FFRED methods, which includes the additional constraint of constant amplitude waveforms.

The minimum-norm formulation may lead to a closed-form solution satisfying the required signal constraints $C^H S = G$. However, the resulting waveform matrix S may have an unacceptable peak-to-average power ratio (PAPR), making the set of waveforms undesirable from an implementation standpoint. In the absence of unity PAPR, the waveforms must be scaled so that the maximum amplitude lies within the linear region of the amplifier to ensure that the waveforms are transmitted without distortion. If the waveforms have the same amplitude (unity PAPR), then the amplifiers can be operated in the more power-efficient saturation region. Thus, the PAPR of the waveforms is directly tied to the total energy emitted from the array (e.g., the antennas 132).

By leveraging the orthogonal complement of C, the PAPR can be reduced while still satisfying the desired signal constraints. Thus, the addition of a constant amplitude constraint to the minimum-norm optimization serves to minimize the energy in the orthogonal complement while achieving both the signal and modulus constraints. However, the addition of the constant modulus constraint results in a waveform solution that is computationally complex to find, which may prevent real-world implementations of the minimum norm solution due to the need for faster computation to accommodate signals that may change from pulse to pulse. To facilitate faster computation, the present disclosure provides a relaxed problem formulation that overcomes the challenges described above. For performance comparison, an optimality bound is also derived via a Lagrange dual function of the original constant amplitude constrained problem.

The minimum-norm optimization problem for determining S can be written as:

$$\underset{S}{\text{minimize}} \quad \|S\|_F^2 \tag{4}$$
$$\text{subject to} \quad C^H S = G$$

where $\|S\|_F^2$ is the squared-Frobenius norm defined as:

$$\|S\|_F^2 = \sum_{m=0}^{M-1} \sum_{n=0}^{N-1} |s_m[n]|^2, \tag{5}$$

The optimization problem in Equation (4) can be reformulated in vectorized notation as:

$$\underset{\tilde{s}}{\text{minimize}} \quad \|\tilde{s}\|_2^2 \tag{6}$$
$$\text{subject to} \quad A^H \tilde{s} = \tilde{g}$$

where $\tilde{s} \in \mathbb{C}^{MN \times 1}$ and $\tilde{g} \in \mathbb{C}^{LN \times 1}$ are vectorized forms of S and G, respectively, $\|\|\tilde{s}\|\|_2^2$ is the squared $l^2$-norm of $\tilde{s}$, $A = I_N \otimes C$ for $I_N$ the N×N identity matrix, and $\otimes$ the Kronecker product. The entries of the vectorized forms are related to those of the matrices as $[\tilde{s}]_{m+Mn} = [S]_{m,n}$ and $[\tilde{g}]_{\ell+Ln} = [G]_{\ell,n}$.

Referring to Equation (6) as Problem A, the Lagrangian for this constrained optimization problem may be given as:

$$\mathcal{L}_A(\tilde{s}; \lambda) = \tilde{s}^H \tilde{s} - \Re\{\lambda^H(A^H \tilde{s} - \tilde{g})\}, \tag{7}$$

where $\lambda \in \mathbb{C}^{N \times 1}$ is the Lagrange multiplier pertaining to the emission constraints and $\Re\{\bullet\}$ extracts the real value. The minimum-norm optimization problem is convex with:

$$\tilde{s}_{*,A} = A(A^H A)^{-1} \tilde{g}, \tag{8}$$

Equation (8) may be equivalently, $\tilde{s}_{*,A}$ written in matrix form as:

$$S_{*,A} = C(C^H C)^{-1} G, \tag{9}$$

the rows of which are the M discretized waveforms that are optimal in the minimum-norm sense. However, these waveforms will tend to not be constant amplitude and possess a high PAPR.

By leveraging the orthogonal complement of C, the PAPR of the waveforms can be lowered considerably. For example, a waveform matrix S that satisfies the emission constraint $C^H S = G$ may have the property:

$$S = S_{*,A} + S_\perp, \tag{10}$$

where $S_\perp = P_\perp S$ is the orthogonal projection of the waveform matrix onto the subspace spanned by the orthogonal complement of C, where $$P_\perp = I_M - C(C^H C)^{-1} C^H, \tag{11}$$

is the orthogonal projection matrix. Therefore, the far-field emission of $S_\perp$ has no impact on the desired emission via $C^H S_\perp = 0_{L \times N}$. In the vectorized form, (10) becomes $$\tilde{s} = \tilde{s}_{*,A} + \tilde{s}_\perp, \tag{12}$$

where $[\tilde{s}_\perp]_{m+Mn} = [S_\perp]_{m,n}$. Thus the property $C^H S_\perp = 0_{L \times N}$ is represented as $A^H \tilde{s}_\perp 0_{LN \times 1}$ in vectorized form.

Because $\tilde{s}_{*,A}$ and $\tilde{s}_\perp$ are constructed using orthogonal subspaces, their inner product is $\tilde{s}_\perp^H \tilde{s}_{*,A} = 0$. Therefore, the energy contained in the waveform matrix $\|\tilde{s}\|_2^2$ is equal to the summation of the energies of the two waveform components:

$$\|\tilde{s}\|_2^2 = \|\tilde{s}_{*,A}\|_2^2 + \|\tilde{s}_\perp\|_2^2. \tag{13}$$

Thus, any waveform matrix S (or $\tilde{S}$) that satisfies $C^H S = G$ (or $A^H \tilde{s} = \tilde{g}$) aside from the minimum-norm solution $S_{*,A}$ (or $\tilde{s}_{*,A}$) will allocate a portion of its energy to $S_\perp$ (or $\tilde{s}_\perp$). The net power efficiency may be increased as long as the power efficiency gained through reduction in PAPR exceeds that of any efficiency lost through the addition of energy within the orthogonal complement $\|\tilde{s}_\perp\|_2^2$. It has been shown that a constant amplitude constrained solution increases the power efficiency of the emission for the case of L=2 beams transmitting a linear frequency modulated radar waveform in one spatial direction and a communications signal in another direction. (The communication modulations considered included rectangular and square-root raised-cosine filtered quadrature phase-shift keying (QPSK) and 4-ary rectangular-filtered continuous phase modulation (CPM) with a modulation index of ½.)

The gain curve of a simplified amplifier model may be used to quantify the power efficiency of a particular waveform matrix. The gain curve is separated into two regions: linear and saturation. The maximum amplifier input in the linear region is normalized to 0 dB. Therefore, to avoid distortion the waveform matrix is normalized by its maximum amplitude, which is denoted as $z = \max_{m,n}\{|s_m[n]|\}$. This normalization corresponds to the well-known procedure of "power back-off".

After normalization, the component of the waveform matrix that contributes to the desired emission may be found via the projection $z^{-1} PS$, where $P = C(C^H C)^{-1} C^H$ projects onto the subspace spanned by C. For a waveform matrix S that satisfies $C^H S = G$, this projection is equivalent to $z^{-1} PS = z^{-1} S_{*,A}$. Thus, the average power in $z^{-1} S_{*,A}$ defines the Average Directed Power (ADP) as:

$$ADP = \frac{\frac{1}{MN}\|S_{*,A}\|_F^2}{\max_{m,n}\{|s_m[n]|^2\}}, \tag{14}$$

for $0 \leq ADP \leq 1$ with ADP=1 representing the most power efficient waveform matrix (only obtained when the minimum-norm solution is constant amplitude and $S = S_{*,A}$).

The constant amplitude constraint can be incorporated into the optimization problem as $$|\tilde{s}_k|^2 - \frac{1}{MN}\|\tilde{s}\|_2^2 = 0$$

for $k=0, 1, \ldots, MN-1$, where $\tilde{s}_k=[\tilde{s}]_k$, thus forcing the squared-amplitude to be equal to the average power. By including this constraint the optimization problem becomes:

$$\text{minimize } \|\tilde{s}\|_2^2 \quad (15)$$
$$\tilde{s}$$
$$\text{subject to } A^H \tilde{s} = \tilde{g}$$
$$|\tilde{s}_k|^2 - \frac{1}{MN}\|\tilde{s}\|_2^2 = 0 \,\forall\, k.$$

Modifying the minimum-norm optimization problem from Equation (4) (or Equation (6)) to include any additional constraints introduces a non-zero $S_\perp$ to the solution (unless the additional constraints are satisfied by the minimum-norm solution). Thus, to satisfy the constant amplitude constraint some amount of energy must be emitted in the directions corresponding to the orthogonal complement of C. However, minimizing $\|\tilde{s}\|_2^2$ also minimizes the energy contained in the orthogonal complement (i.e., $\|\tilde{s}_\perp\|_2^2$) according to Equation (13).

The constant amplitude constraint in Equation (15) can be implicitly incorporated by exchanging $\tilde{s}$ with a waveform model given by:

$$\tilde{s}=\gamma \exp(jx), \quad (16)$$

where $j=\sqrt{-1}$, $\gamma \in \mathbb{R}$ is a real-valued amplitude scalar, $x \in \mathbb{R}^{MN \times 1}$ is a vector of phase values, and the entries of the exponential are defined as $[\exp(jx)]_k = \exp(jx_k)$. Using the waveform mode in Equation (16) the optimization problem from Equation (15) can be equivalently represented as:

$$\text{minimize } \gamma^2 \quad (17)$$
$$\gamma, x$$
$$\text{subject to } \gamma A^H \exp(jx) = \tilde{g}$$

The number of optimized parameters for Equation (17) is reduced from 2MN real-valued coefficients (MN complex-valued) to MN+1 real-valued parameters while removing a constraint from the problem. That said, the optimization problem in Equation (17) is nonconvex and computationally prohibitive to solve directly. However, the Lagrangian of the problem in Equation (17) can be used to find a lower bound for the objective function $\gamma^2$ via the Lagrange dual problem. This bound provides a test for solution quality when optimizing parameter $(\gamma, x)$ according to a relaxed version of Equation (17) described in more detail below.

Referring to Equation (17) as Problem B, the Lagrangian for Problem B may be given by:

$$\mathcal{L}_B(\gamma, x; \lambda) = \gamma^2 - \Re\{\lambda^H(\gamma A^H \exp(jx) - \tilde{g})\}. \quad (18)$$

The Lagrange dual function (denoted here as $\mathcal{G}(\lambda)$) may be found by minimizing $\mathcal{L}_B(\gamma, x; \lambda)$ over the parameters $(\gamma, x)$, which may be expressed as:

$$\mathcal{G}(\lambda) = \inf_{\gamma, x} \mathcal{L}_B(\gamma, x; \lambda), \quad (19)$$

which results in the expression:
$$\mathcal{G}(\lambda) = -\tfrac{1}{4}\|A\lambda\|_1^2 + \Re\{\lambda^H, \tilde{g}\}. \quad (20)$$

The Lagrange dual function is concave over the Lagrange multipliers (even for nonconvex optimization problems). Thus the Lagrange dual problem is the maximization of the dual function.

The optimal function value $\mathcal{G}(\lambda_*)$ sets a lower bound for the value of the original objective function, which may be written as:

$$\mathcal{G}(\lambda_*) \leq \gamma_*^2, \quad (21)$$

where $\gamma_*^2$ is the global minimum of Equation (17). It is noted that the dual function from Equation (20) was found to have weak duality except for the case when N=1, which has strong duality. Updating the energy relationship from Equation (13) to incorporate $\gamma$ (assuming the constraint from Equation (17) holds) yields:

$$\gamma^2 = \frac{1}{MN}\|\tilde{s}_{*,A}\|_2^2 + \frac{1}{MN}\|\tilde{s}_\perp\|_2^2. \quad (22)$$

Therefore, $\mathcal{G}(\lambda_*)$ is effectively a lower bound on the amount of energy contained in the orthogonal complement (i.e., $\|\tilde{s}_\perp\|_2^2$) that is needed to achieve both the amplitude and emission constraints. Note that the bound in Equation (21) may not be tight. However, a feasible waveform matrix with square-amplitude $\gamma^2$ close to this bound gives an indication that the waveform matrix is a near-optimal solution to Equation (17). It is noted that while Problems A and B have been designed to produce optimal solutions, these solutions remain ill-suited for real world implementation due to hardware and other computational limitations.

Having demonstrated the minimum norm solution (Problem A) and the constant-amplitude constrained formulation (Problem B) above, a reduced computational complexity solution according to embodiments of the present disclosure will now be described. To reduce the computational complexity associated with solving Equation (17) a relaxed problem may be formulated that only considers the feasibility of $(\gamma, x)$ as represented by the constraint $\gamma A^H \exp(jx) = \tilde{g}$. This relaxed problem may be expressed as:

$$\text{minimize } \mathcal{J}(\tilde{\gamma}, \tilde{x}) = \|\tilde{\gamma} A^H \exp(j\tilde{x}) - \tilde{g}\|_2^2, \quad (23)$$
$$\tilde{\gamma}, \tilde{x}$$

where $\tilde{\gamma}$ and $\tilde{x}$ are used to distinguish the parameters from those of Equation (17). The minimum of Equation (23) is guaranteed to be feasible for Equation (17) given that such a point exists, and the quality of the solution found using the relaxed formulation can be determined by comparing $\tilde{\gamma}^2$ to the bound in Equation (21).

A multivariate function can be minimized by first minimizing over a portion of the variables, and then minimizing over the remaining variables. For the objective function $\mathcal{J}(\tilde{\gamma}, \tilde{x})$, this property is shown via the relationship:

$$\inf_{\tilde{\gamma}, \tilde{x}} \mathcal{J}(\tilde{\gamma}, \tilde{x}) = \inf_{\tilde{x}}\left(\inf_{\tilde{\gamma}} \mathcal{J}(\tilde{\gamma}, \tilde{x})\right) = \inf_{\tilde{\gamma}}\left(\inf_{\tilde{x}} \mathcal{J}(\tilde{\gamma}, \tilde{x})\right). \quad (24)$$

By minimizing $\mathcal{J}(\tilde{\gamma}, \tilde{x})$ with respect to $\tilde{\gamma}$, an amplitude having a closed form solution may be found, which can be expressed as:

$$\tilde{\gamma}(\tilde{x}) = \frac{\Re\{\tilde{g}^H A^H \exp(j\tilde{x})\}}{\|A^H \exp(j\tilde{x})\|_2^2}. \quad (25)$$

Thus, the property in Equation (24) can be employed to formulate the problem as a minimization of objective function $\mathcal{J}(\tilde{\gamma}(\tilde{x}),\tilde{x})$ over only the phase vector $\tilde{x}$.

Inserting $\tilde{\gamma}(\tilde{x})$ from Equation (25) into $\mathcal{J}(\tilde{\gamma},\tilde{x})$ from Equation (23) yields a modified objective function, given by:

$$\mathcal{J}(\tilde{\gamma}(\tilde{x}),\tilde{x}) = \tilde{\mathcal{J}}(\tilde{x}) = \|\tilde{g}\|_2^2 - \frac{\Re\{\tilde{g}^H A^H \exp(j\tilde{x})\}^2}{\|A^H \exp(j\tilde{x})\|_2^2}. \quad (26)$$

The gradient of $\tilde{\mathcal{J}}(\tilde{x})$ with respect to $\tilde{x}$ can be shown to be:

$$\nabla_{\tilde{x}}\tilde{\mathcal{J}}(\tilde{x}) = 2\Im\{\tilde{\gamma}(\tilde{x})\exp(-j\tilde{x}) \odot (A(\tilde{\gamma}(\tilde{x})A^H \exp(j\tilde{x}) - \tilde{g})\}, \quad (27)$$

where $\odot$ is the Hadamard (element-wise) product and $\Im\{\bullet\}$ extracts the imaginary part of the argument. The form of the gradient in Equation (27) can be used in a multitude of different algorithms to converge onto a locally-optimal point of $\tilde{\mathcal{J}}(\tilde{x})$. Note that the relaxed objective function in Equation (26) is nonconvex and the obtained solution is dependent on the initialization of $\tilde{x}$.

For a locally-optimal phase vector $\tilde{x}_*$ that minimizes Equation (26) and meets the feasibility requirements of $\tilde{\mathcal{J}}(\tilde{x}_*)=0$, the inequality bound from Equation (21) can be rewritten as:

$$\mathcal{G}(\lambda_*) \leq \gamma_* \leq \tilde{\gamma}^2(\tilde{x}). \quad (28)$$

Using Equation (22), the bound from Equation (28) can be stated in terms of the converged orthogonal energy $$\|\tilde{s}_{\perp,*}\|_2^2 \text{ as } \frac{1}{MN}\|\tilde{s}_{\perp,*}\|_2^2 \geq \mathcal{G}(\lambda_*) - \frac{1}{MN}\|\tilde{s}_{*,A}\|_2^2.$$

Normalizing this lower bound to unity yields the metric:

$$\beta = \frac{\frac{1}{MN}\|\tilde{s}_{\perp,*}\|_2^2}{\mathcal{G}(\lambda_*) - \frac{1}{MN}\|\tilde{s}_{*,A}\|_2^2} \geq 1, \quad (29)$$

where $\beta$ represents the ratio of the converged average orthogonal power $$\frac{1}{MN}\|\tilde{s}_{\perp,*}\|_2^2 \text{ to } \left(\mathcal{G}(\lambda_*) - \frac{1}{MN}\|\tilde{s}_{*,A}\|_2^2\right)$$

which represents a theoretical lower bound on average orthogonal power. Likewise, using Equation (14), the bound from Equation (28) can be rearranged in terms of the ADP of the converged solution, which may be expressed as:

$$\frac{\text{ADP}}{\text{ADP}_{opt}} \leq 1, \quad (30)$$

where $$\text{ADP} = \frac{1}{MN}\|S_{*,A}\|_F^2 \tilde{\gamma}^{-2}(\tilde{x}_*)$$

represents the average directed power of the obtained solution and $$\text{ADP}_{opt} = \frac{1}{MN}\|S_{*,A}\|_F^2 \tilde{\gamma}^{-2}(\tilde{x}_*)\mathcal{G}^{-1}(\lambda_*)$$

is the theoretical upper bound on average directed power for a constant amplitude solution.

A Monte Carlo analysis was used to characterize the performance of the relaxed FFRED formulation described above for the cases of $L \in \{2, 3, 4\}$ simultaneous signals. In each case the desired transmission angles $(\theta_\ell, \varphi_\ell)$ and signals $g_\ell(t)$ were based on randomized parameters, and the converged values of $\tilde{\gamma}^2(\tilde{x}_*)$ are compared to $\mathcal{G}(\lambda_*)$ using the metrics defined in Equations (29) and (30).

The desired signals were chosen to have a constant amplitude, which decreases the amount of energy in the orthogonal complement needed to achieve a feasible solution. Using this configuration, the desired signals conform to:

$$g_\ell(t) = \begin{cases} a_\ell \exp(j\psi_\ell(t)) & 0 \leq t \leq T \\ 0 & \text{otherwise} \end{cases}, \quad (31)$$

where $a_\ell$ is a real-valued, positive scalar and $\psi_\ell(t)$ is the continuous phase function. It may be assumed that $g_0(t)$ is the dominant signal in energy relative to the other signals (e.g., a radar transmission). Therefore, $a_0=1$ while the remaining $L-1$ signal amplitudes are randomly drawing according to $10 \log_{10} a_\ell^2 \sim U[-20, -10]$, where $U[a, b]$ is the uniform probability distribution over the interval $[a, b]$. Thus the remaining amplitudes range from $-20$ dB to $-10$ dB relative to the dominant signal.

The continuous phase function $\psi_\ell(t)$ was randomly generated using a random parameterization of the polyphase coded frequency-modulated (PCFM) framework given by:

$$\psi_\ell(t) = \int_0^t \sum_{n=0}^{N_p-1} \alpha_{\ell,n} h(\zeta - nT_p) d\zeta, \quad (32)$$

where $\alpha_{\ell,n} \sim U[-\pi, \pi]$ are the $N_p$ PCFM code values, $h(t)$ is a shaping filter, and $T_p=T/N_p \approx 1/B$. Here, $h(t)$ may be chosen to be a truncated-Gaussian window with duration $3T_p$ and unit area. The sampling rate is $f_s=3B=3/T_p$ and $N_p=40$ random code values per pulse equates to $N=120$ samples in each discretized waveform. This signal could represent either a radar or communications transmission (e.g., FM noise radar, continuous phase modulation (CPM) communications, etc.).

For this analysis, consider an $M=16$ element uniform linear array (ULA) with half-wavelength spacing aligned in the $\theta=0°$ plane with array boresight toward $\varphi=0°$. The antenna patterns from Equation (2) were assumed to be omnidirectional in the θ=0° plane and normalized to unity, thus the mth in-situ antenna pattern is expressed as $$F_m(\theta = 0°, \varphi) = \exp\left(jm\frac{2\pi}{\lambda}d\sin\varphi\right). \quad (33)$$

The desired transmission directions in the elevation dimension are fixed to $\theta_\ell = 0° \forall \ell$; thus, the signals are separated in azimuth $\varphi_\ell$. The dominant signal is directed towards array boresight at $\varphi_0=0°$ while the remaining signal directions are sequentially determined according to independent draws from $\sin \varphi_\ell \sim U[-1,1]$. If a randomly chosen transmission angle falls from within the array peak-to-null beamwidth of a previously chosen angle (i.e., $|\sin \varphi_\ell - \sin \varphi_i| < 2/M$ for $i=0, \ldots, \ell -1$) a new angle is randomly selected until the condition is satisfied.

A total of 2000 Monte Carlo trials were performed for two different phase initializations (i.e. $\tilde{x}_0$) for each of the $L \in \{2, 3, 4\}$ desired signals: uniformly distributed initialization, $\tilde{x}_0 \sim U[-\pi, \pi]$; and initialized using the phase of the minimum-norm solution $\tilde{x}_0 = \arg\{\tilde{s}_{*,A}\}$, where $\arg\{\bullet\}$ extracts the phase. A limited-memory Broyden-Fletcher-Goldfarb-Shanno (L-BFGS) algorithm (coupled with a backtracking line search) was used to minimize the relaxed problem from Equation (23) for each Monte Carlo trial. A total of 10 prior gradients are kept during the optimization process for estimation of the local second-order properties of $\tilde{J}(\tilde{x})$. The algorithm was terminated when $\tilde{J}(\tilde{x}) < \|\tilde{g}\|_2^2 \times 10^{-12}$. The dual function $\mathcal{G}(\lambda_*)$ from Equation (20) was maximized using the CVX Matlab toolbox.

Figure 4A:
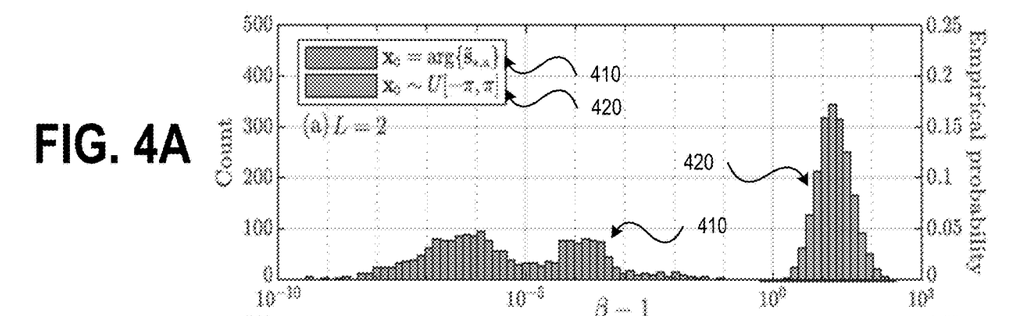
FIGS. 4A-4C are histograms illustrating aspects of transmissions according to aspects of the present disclosure.
Figure 4B:
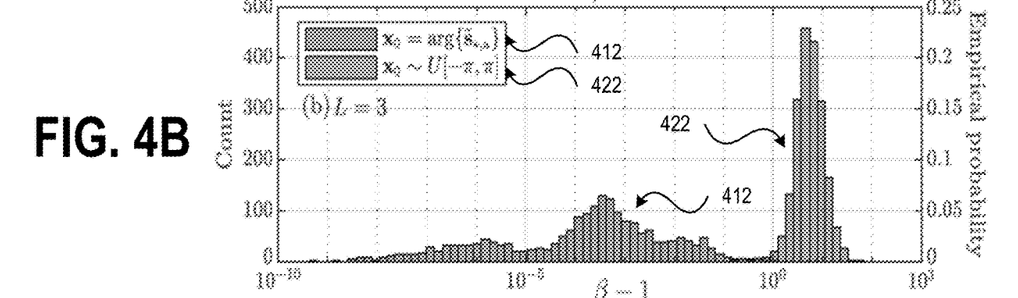
Figure 4C:
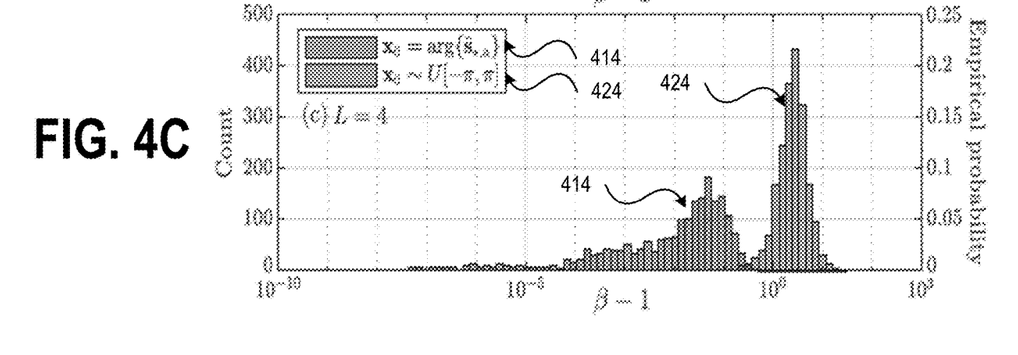

FIGS. 4A-4C show histograms of $\beta-1 \geq 0$ from Equation (29) for the minimum-norm phase initializations (410, 412, 414, respectively) and the random phase initializations (420, 422, 424, respectively) for (a) L=2, (b) L=3, and (c) L=4 desired signals. As shown in FIGS. 4A-4C, it can be observed that the bound from Equation (21) is tight for the minimum-norm phase initialization since $\beta-1$ takes on values on the order of $10^{-10}$. Recall that $\beta$ represents the ratio of the obtained average orthogonal power to its theoretical lower bound. Therefore, the energy in the orthogonal complement is marginally greater than the theoretical lower bound for all three cases, increasing slightly when L is increased. The random phase initialization falls into a local minimum of $\tilde{J}(\tilde{x})$, resulting in a significant increase in $\beta$ and thereby indicating that the energy in the orthogonal complement is not near the theoretical bound for this initialization.

Figure 5:
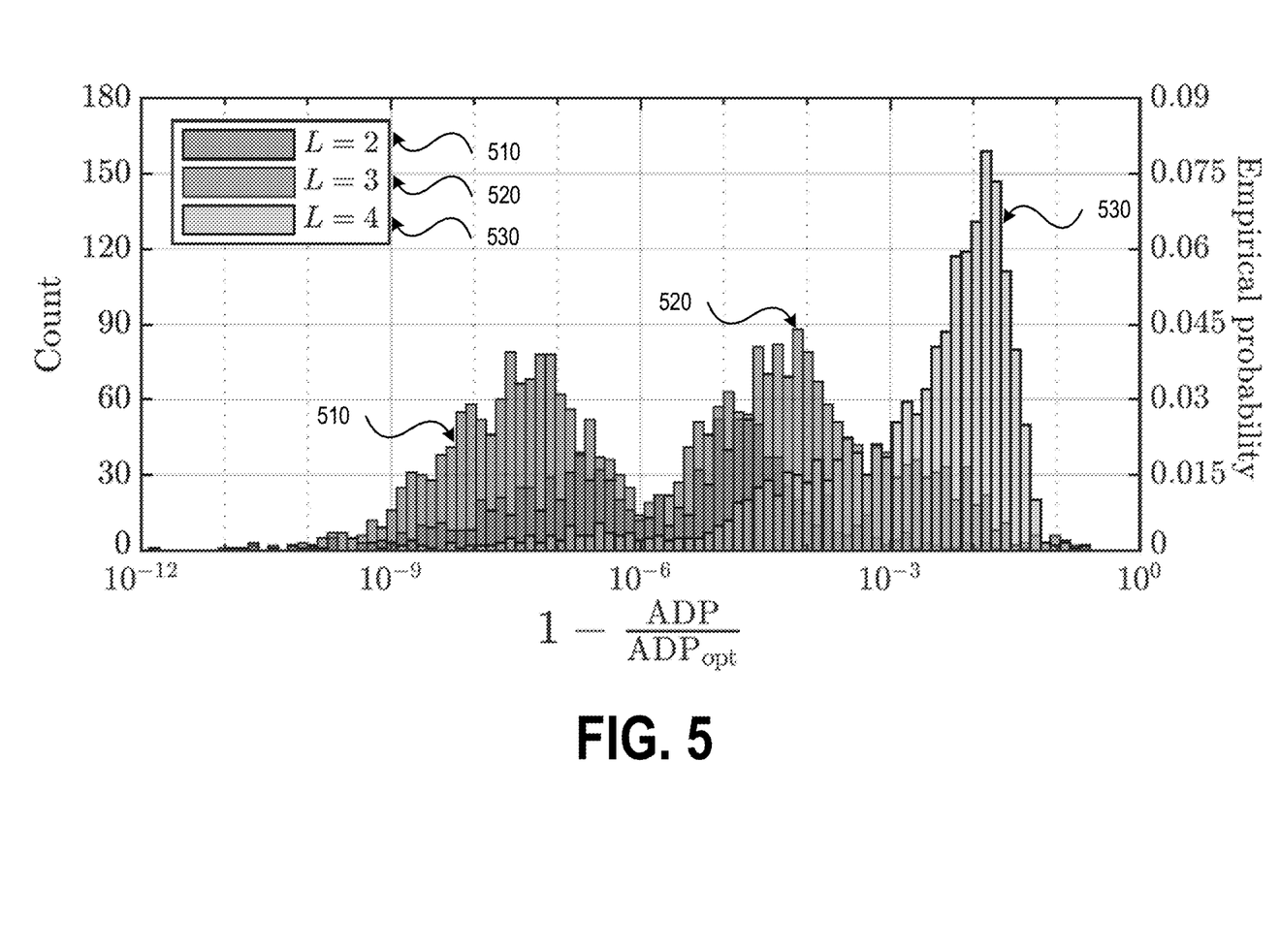
FIG. 5 is a histogram illustrating aspects of transmissions according to aspects of the present disclosure.

FIG. 5 depicts histograms of $$1 - \frac{ADP}{ADP_{opt}} \geq 0$$

from Equation (30) for the minimum-norm phase initialization and L=2, 3, 4 desired signals. These results indicate that the solutions found using the relaxed problem from Equation (23) with the minimum-norm phase initialization are near-optimal in terms of power efficiency relative to the original problem in Equation (17).

As shown above, the ability to emit multiple signals simultaneously from a digital array, such as the antennas 132 of FIG. 1, provides the flexibility to efficiently use all available resources (i.e., time, frequency, space, and power) for multiple functions (e.g., radar and/or communications).

The FFRED formulation disclosed herein considers efficient use of all the resources while conforming to practical waveform constraints (e.g., constant amplitude). The Lagrange dual problem of FFRED provides an optimality bound upon the amount of energy in the orthogonal complement needed to achieve a solution. It is shown that a near-optimal (in terms of orthogonal complement energy) set of waveform can be designed via minimization of a relaxed FFRED formulation of embodiments initialized with the phase of the minimum-norm solution. It is noted that the relaxed nature of the disclosed FFRED formulation reduces the computational complexity required to determine the set of waveforms and enables the set of waveforms to be determined much more rapidly and approaching a speed that enables the set of waveforms to be identified despite pulse-to-pulse changes with respect to one or more of the transmitted radar or communication signals.

Referring back to FIG. 1, utilizing the relaxed FFRED formulation described above, the transmission system 101 may determine a set of power efficient waveforms. As described above, to determine the set of power efficient waveforms, the transmission system 101 may determine a set of signals for transmission and a transmission direction for each signal of the set of signals. The set of signals may include at least a first signal and a second signal, where the first signal may be associated with a first transmission direction and the second signal may be associated with a second transmission direction and the first direction and the second direction are different from each other. In an aspect, the first signal and second signal may be the output radar waveform 102 and the communication waveform 106. To facilitate transmission of the first and second signals, the transmission system 101 may determine a set of waveforms that may be transmitted by the antenna elements 132 in a power efficient manner. The set of waveforms may be determined by configuring an optimization problem based on characteristics of an antenna array (e.g., the antenna elements) and the set of signals. For example, the characteristics of the antenna array may include the shape or arrangement of the antenna elements (e.g., antenna elements arranged linearly or another shape), the number of antenna elements, and the characteristics of the set of signals may include the number of signals to be transmitted, the directions each signal of the set of signals is to be transmitted, or other characteristics.

As described above, the transmission system 101 may solve the optimization problem to identify a set of waveforms. The set of waveforms may include at least two waveforms, each of the at least two waveforms corresponding to a different antenna element of the antenna array. It is noted that if the antenna array include more than two antenna elements, the set of waveforms may include more than two antenna elements in some implementations. The optimization problem may be configured to identify a set of power efficient waveforms. In an aspect, the waveforms may satisfy a constant amplitude constraint and an orthogonality constraint. In an aspect, the optimization problem may configured in accordance with Equations 23-30. Once the set of waveforms are determined, the transmission system 101 may transmit the set of waveforms from the antenna elements of the antenna array, where each waveform of the set of waveforms is transmitted by a different one of the antenna elements. It is noted that solving the optimization problem may yield a set of waveforms that may be transmitted by the antenna elements 132, where each transmitting antenna element transmits a different waveform (i.e., all antenna elements used for transmission do not transmit the exact same waveform). Each antenna element used for the transmission may transmit a waveform (e.g., one of the set of waveforms identified by solving the optimization problem) that is different from the other waveforms transmitted by the other antenna elements. For example, the waveforms for each antenna element may have a different modulation structure, different angles of transmission, different beam powers, and the like. However, the set of waveforms identified by the optimization problem may result in a set of waveforms that, while different for each antenna element, are highly correlated and coherent in the far-field.

In aspects where the set of transmitted waveforms include radar waveforms, the transmission system 101 may be configured to receive a set of radar waveform returns, such as the radar waveform returns 104. The received radar waveform returns may correspond to reflections of the transmitted radar waveforms 102. The radar waveform return 104 may be used by the transmission system 101 to perform moving target detection, such as to track or locate the target of interest 140. In addition to transmission of radar waveforms, the transmission system 101 may also transmit communication signals (i.e., data) via the set of waveforms. For example, the set of waveforms may include the communication waveform 106 of FIG. 1, which may be used to communicate data to the electronic device 150 or other devices (not shown in FIG. 1). In an aspect, the communication waveform 106 may be used to transmit telemetry signals, or other types of communication signals. In an aspect, the set of waveforms identified based on the optimization problem may be suitable for long range transmission communication signals (e.g., due to the high power efficiency properties of the determined set of waveforms, etc.).

As briefly mentioned above, one or more of the signals (e.g., the radar signal, the communication signal, or both) may change over time (e.g., from pulse-to-pulse). To account for these changes, the transmission system 101 may perform the above-described steps (e.g., the determining, configuring, and solving) based on changes to the set of signals over time. As explained above, power efficiency may be achieved in part by constraining the set of waveforms to be constant amplitude continuous-time waveforms, which enables the amplifier of the transmitter to be operated within a more power efficient saturation region. However, mere use of a set of constant amplitude continuous waveforms does not mean that those specific waveforms are the most power efficient—indeed, some sets of waveforms having these properties may be less efficient than others when wasted energy is taken into consideration. To mitigate the wasted energy, the optimization problem may be configured to identify a set of waveforms with minimal wasted energy (e.g., transmission of the set of waveforms in specific directions may still result in wasted energy as some of the waveform energy may be directed into other spaces or directions). In an aspect, solving the optimization problem may include minimizing a cost function to identify a set of waveforms that is power efficient when wasted energy is accounted for.

As shown above, the platform 100 provides a feasible approach for realizing a transmission system capable of transmitting radar and communication signals simultaneously in a power efficient manner that maintains coherency in the far-field. Such capabilities enable the system to be used for radar detection operations while simultaneously transmitting communication data to remote devices, such as the electronic device 150. Moreover, the communication signals transmitted by the platform 100 may be suitable for long distance communications applications due to the high power nature of the transmitted signals and the power efficiency achieved via the disclosed optimizations. Additionally, the relaxed optimization solution disclosed herein demonstrates that it is feasible to design a transmission system that can identify sets of waveforms on a pulse-to-pulse basis, thereby overcoming the shortfalls of previous theoretical FFRED approaches. Moreover, it is noted that while sets of waveforms suitable for simplistic use cases could be calculated manually, it is impossible to manually calculate sets of waveforms for more complex use cases, such as radar and communication applications. Accordingly, it is to be understood that the relaxed approach to FFRED disclosed herein represents an improvement in the functioning of transmission systems, such as the transmission system 101 and other similar type systems (e.g., systems capable of transmitting waveforms similar to those disclosed herein).

Figure 6:
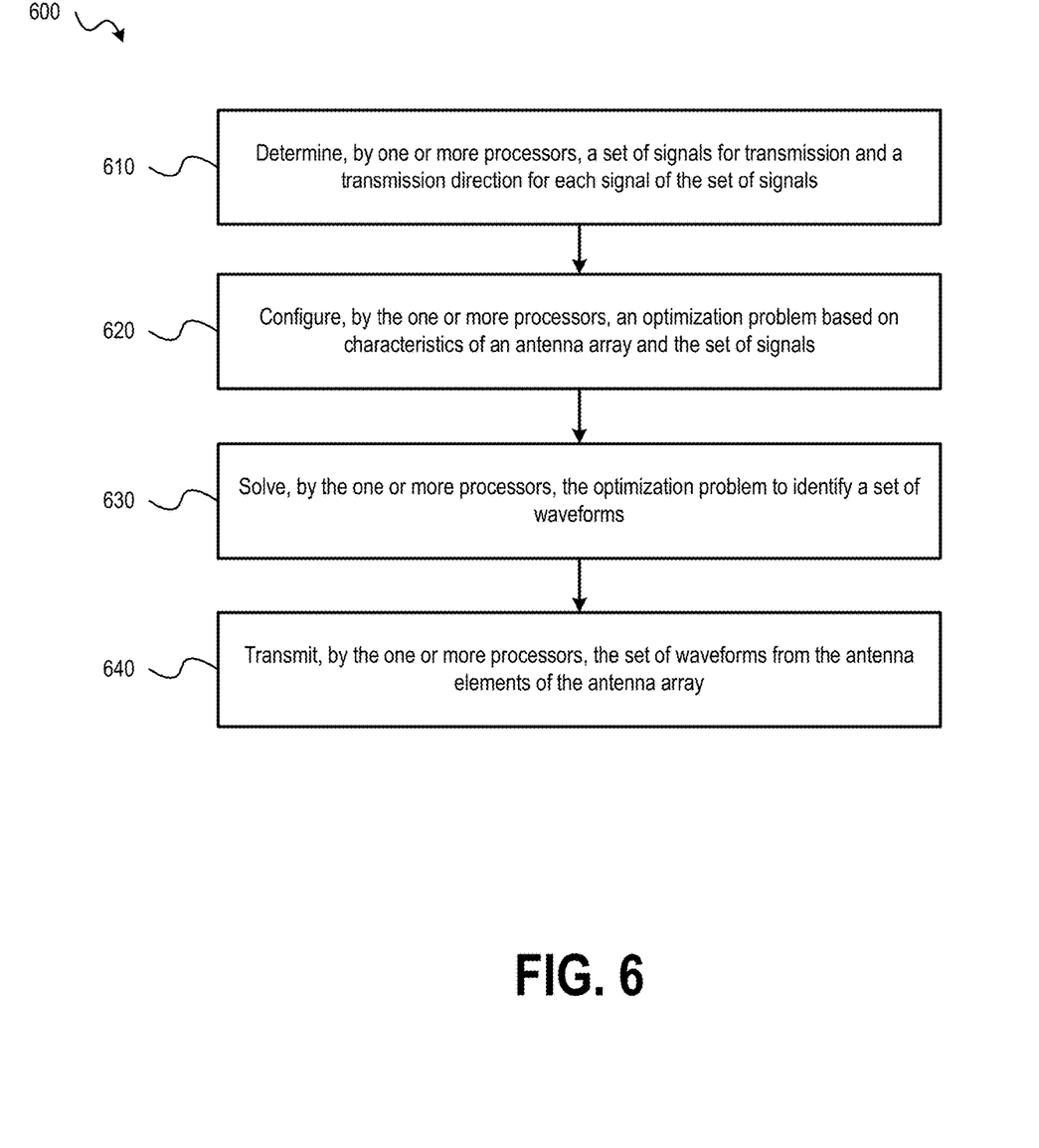
FIG. 6 is a flow diagram of a method for generating and transmitting waveforms in accordance with the present disclosure in accordance with aspects of the present disclosure in accordance with aspects of the present disclosure.

Referring to FIG. 6, a flow diagram of a method for generating and transmitting waveforms in accordance with aspects of the present disclosure is shown as a method 600. In aspects, steps of the method 600 may be performed by a system, such as the transmission system 101 of FIG. 1. In an aspect, steps of the method 600 may be stored as instructions (e.g., the instruction 122 of FIG. 1) that, when executed by one or more processors (e.g., the one or more processors 110 of FIG. 1), cause the one or more processors to perform the steps of the method 600.

As shown in FIG. 2, the method 200 includes, at step 210, determining, by one or more processors, a set of signals for transmission and a transmission direction for each signal of the set of signals. As described above, the set of signals may include at least a first signal and a second signal. The first signal may be associated with a first transmission direction and the second signal may be associated with a second transmission direction that is different from the first direction. At step 620, the method 600 includes configuring, by the one or more processors, an optimization problem based on characteristics of an antenna array and the set of signals. As described above, the optimization problem may be a relaxed FFRED algorithm configured to identify a set of waveforms that are power efficient and coherent in the far-field, allowing the waveforms to be used to transmit both communications data and radar signals simultaneously. Moreover, the relaxed FFRED algorithm may enable sets of waveforms to be identified fast enough to account for changes in the signals over time, thereby overcoming limitations of previous theoretical FFRED approaches.

At step 630, the method 600 includes solving, by the one or more processors, the optimization problem to identify a set of waveforms. As described above, the set of waveforms may include at least two waveforms. Each of the at least two waveforms may correspond to a different antenna element of the antenna array, such that each waveform of the set of waveforms is configured for transmission by a different antenna element of the antenna array. At step 640, the method 600 includes transmitting, by the one or more processors, the set of waveforms from the antenna elements of the antenna array. In some aspects, the method 600 may include performing radar detection operations based on received radar waveform returns corresponding to at least some of the transmitted waveforms. It is noted that the method 600 may include additional operations and steps as described above with reference to FIGS. 1-5. As shown above, the method 600 provides a feasible approach for realizing a transmission system capable of transmitting radar and communication signals simultaneously in a power efficient manner that maintains coherency in the far-field. Such capabilities enable the system implementing the method 600 to be used for radar detection operations while simultaneously transmitting communication data to remote devices, such as the electronic device 150 of FIG. 1. Moreover, the communication signals transmitted in accordance with the method 600 may be suitable for long distance communications applications due to the high power nature of the transmitted signals and the power efficiency achieved via the disclosed optimizations.

Although the embodiments of the present disclosure and their advantages have been described in detail, it should be understood that various changes, substitutions and alterations can be made herein without departing from the spirit and scope of the disclosure as defined by the appended claims. Further, although the drawings may illustrate some of the concepts disclosed herein as logical or functional blocks, it is to be understood that each of those blocks may be implemented in hardware, software, or a combination of hardware and software. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
    determining, by one or more processors, a set of signals for transmission and a transmission direction for each signal of the set of signals, wherein the set of signals comprise at least a first signal and a second signal, the first signal associated with a first transmission direction and the second signal associated with a second transmission direction that is different from the first transmission direction;
    configuring, by the one or more processors, an optimization problem based on first characteristics of an antenna array and second characteristics of the set of signals, wherein the optimization problem is associated with a far-field radiated emission design and corresponds to minimization of an objective function over a phase vector associated with the set of signals;
    solving, by the one or more processors, the optimization problem to identify a set of waveforms, wherein the set of waveforms comprises at least two waveforms, each of the at least two waveforms corresponding to a different antenna element of the antenna array; and
    transmitting, by the one or more processors, the set of waveforms from the antenna elements of the antenna array, wherein:
        at least a first waveform of the two waveforms comprises a radar waveform,
        at least a second waveform of the two waveforms comprises a communication waveform, and
        the first waveform and the second waveform are transmitted simultaneously.

2. The method of claim 1, wherein the objective function is a function of at least the first transmission direction and the second transmission direction, the method further comprising:
    receiving a set of radar waveform returns corresponding to reflections of the radar waveforms; and
    performing moving target detection based on the received radar waveform returns.

3. The method of claim 1, wherein:
    the communication waveforms comprise telemetry signals,
    the set of waveforms comprise constant amplitude waveforms, and
    the set of waveforms comprise a different waveform for each antenna element of the antenna array.

4. The method of claim 1, further comprising repeatedly performing the determining, the configuring, and the solving based on changes to the set of signals over time.

5. The method of claim 4, wherein the changes to the set of signals over time correspond to changes in characteristics of communication signals.

6. The method of claim 1, wherein solving the optimization problem comprises minimization of a cost function configured to reduce wasted energy during transmission of the set of signals.

7. The method of claim 1, further comprising:
    operating an amplifier of a transmitter in a saturation region to transmit the set of waveforms.

8. The method of claim 1, wherein at least the first signal or at least the second signal changes from pulse-to-pulse.

9. The method of claim 1, wherein the first characteristics of the antenna array include a shape of the antenna elements.

10. The method of claim 1, wherein the second characteristics of the set of signals includes, for each of the first signal and the second signal, the first transmission direction and the second transmission direction.

11. The method of claim 1, wherein solving the optimization problem comprises minimizing the objective function over the phase vector.

12. The method of claim 1, wherein a first modulation of a first waveform of the at least two waveforms differs from a second modulation of a second waveform of the at least two waveforms.

13. A non-transitory computer-readable medium storing instructions that, when executed by one or more processors, cause the one or more processors to perform operations comprising:
    determining a set of signals for transmission and a transmission direction for each signal of the set of signals, wherein the set of signals comprise at least a first signal and a second signal, the first signal associated with a first transmission direction and the second signal associated with a second transmission direction that is different from the first transmission direction;
    configuring an optimization problem based on first characteristics of an antenna array and second characteristics of the set of signals, wherein the optimization problem is associated with a far-field radiated emission design and corresponds to minimization of an objective function over a phase vector associated with the set of signals;
    solving the optimization problem to identify a set of waveforms, wherein the set of waveforms comprises at least two waveforms, each of the at least two waveforms corresponding to a different antenna element of the antenna array; and transmitting the set of waveforms from the antenna elements of the antenna array corresponding to the at least two waveforms, wherein:
  at least a first waveform of the two waveforms comprises a radar waveform,
  at least a second waveform of the two waveforms comprises a communication waveform, and
  the first waveform and the second waveform are transmitted simultaneously.

14. The non-transitory computer-readable medium of claim 13, wherein the communication waveforms comprise telemetry signals, the set of waveforms comprise constant amplitude waveforms, and the operations further comprise:
  receiving a set of radar waveform returns corresponding to reflections of the radar waveforms; and
  performing moving target detection based on the received radar waveform returns.

15. The non-transitory computer-readable medium of claim 13, wherein the set of waveforms comprise a different waveform for each antenna element of the antenna array, and wherein solving the optimization problem comprises minimization of a cost function configured to reduce wasted energy during transmission of the set of signals.

16. The non-transitory computer-readable medium of claim 13, the operations comprising repeatedly performing the determining, the configuring, and the solving based on changes to the set of signals over time.

17. A system comprising:
  an antenna array comprising a plurality of antenna elements;
  one or more processors configured to:
    determine a set of signals for transmission by the plurality of antenna elements and a transmission direction for each signal of the set of signals, wherein the set of signals comprise at least a first signal and a second signal, the first signal associated with a first transmission direction and the second signal associated with a second transmission direction that is different from the first transmission direction;
    configure an optimization problem based on first characteristics of the antenna array and second characteristics of the set of signals, wherein the optimization problem is associated with a far-field radiated emission design and corresponds to minimization of an objective function over a phase vector associated with the set of signals;
    solve the optimization problem to identify a set of waveforms, wherein the set of waveforms comprises at least two waveforms, each of the at least two waveforms corresponding to a different antenna element of the plurality of antenna elements; and
    initiate transmission of the set of waveforms from the antenna elements of the antenna array corresponding to the at least two waveforms, wherein:
      at least a first waveform of the two waveforms comprises a radar waveform,
      at least a second waveform of the two waveforms comprises a communication waveform, and
      the first waveform and the second waveform are transmitted simultaneously.

18. The system of claim 17, the one or more processors are further configured to:
  receive a set of radar waveform returns corresponding to reflections of the radar waveforms; and
  perform moving target detection based on the received radar waveform returns.

19. The system of claim 17, wherein the one or more processors are further configured to:
  repeatedly determine the set of signals,
  configure the optimization problem, and
  solve the optimization problem based on changes to the set of signals over time.

20. The system of claim 17, wherein, to solve the optimization problem, the one or more processors are configured to:
  minimize a cost function configured to reduce wasted energy during transmission of the set of signals.

* * * * *

UNITED STATES PATENT AND TRADEMARK OFFICE
CERTIFICATE OF CORRECTION

PATENT NO. : 12,320,885 B2
APPLICATION NO. : 17/086006
DATED : June 3, 2025
INVENTOR(S) : Patrick M. McCormick et al.

Page 1 of 1

It is certified that error appears in the above-identified patent and that said Letters Patent is hereby corrected as shown below:

In the Specification

At Column 7, Line number 44, delete "$\|\|\tilde{s}\|_2^2$" and replace with -- $\|\tilde{s}\|_2^2$ --.

At Column 7, Line number 52, delete "$\lambda \in \mathbb{C}^{N \times 1}$" and replace with -- $\lambda \in \mathbb{C}^{LN \times 1}$ --.

At Column 8, Line number 18, delete "$A^H \tilde{s}_\perp 0_{LN \times 1}$" and replace with -- $A^H \tilde{s}_\perp = 0_{LN \times 1}$ --.

At Column 10, Line number 56, delete "$\gamma^2$" and replace with -- $\tilde{\gamma}^2$ --.

At Column 11, Line number 38, Equation 28, delete "$\mathcal{G}(\lambda_\star) \leq \gamma_\star \leq \tilde{\gamma}^2(\tilde{x})$," and replace with -- $\mathcal{G}(\lambda_\star) \leq \gamma_\star^2 \leq \tilde{\gamma}^2(\tilde{x}_\star)$ --.

At Column 12, Line number 46, delete "$10 \log_{10} \alpha_\ell^2 \sim U[-20, -10]$" and replace with --$10 \log_{10} |\alpha_\ell|^2 \sim U[-20, -10]$ --.

Signed and Sealed this
Fifteenth Day of July, 2025

Coke Morgan Stewart
*Acting Director of the United States Patent and Trademark Office*